(12) United States Patent
Mori et al.

(10) Patent No.: US 8,344,594 B2
(45) Date of Patent: Jan. 1, 2013

(54) VIBRATION WAVE DRIVEN APPARATUS AND IMAGE PICKUP APPARATUS INCLUDING VIBRATION WAVE DRIVEN APPARATUS

(75) Inventors: Takao Mori, Tokyo (JP); Takahiro Oya, Yokohama (JP); Hiroyuki Wada, Yokohama (JP); Shigeru Takeshita, Yokohama (JP); Shuichi Terada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 301 days.

(21) Appl. No.: 12/819,084

(22) Filed: Jun. 18, 2010

(65) Prior Publication Data

US 2010/0321806 A1 Dec. 23, 2010

(30) Foreign Application Priority Data

Jun. 23, 2009 (JP) .................................. 2009-149055

(51) Int. Cl.
*H02N 2/00* (2006.01)

(52) U.S. Cl. ......... 310/323.13; 310/323.02; 310/323.16; 310/323.17

(58) Field of Classification Search ............ 310/323.01–323.19, 328
See application file for complete search history.

(56) References Cited

U.S. PATENT DOCUMENTS

| 5,394,049 | A | * | 2/1995 | Luecke ......................... 310/328 |
| 5,413,770 | A | * | 5/1995 | Sakaguchi et al. ............ 422/225 |
| 5,543,670 | A | * | 8/1996 | Luecke ........................... 310/26 |
| 5,973,439 | A | * | 10/1999 | Nishio et al. ............. 310/323.12 |
| 6,606,206 | B2 |   | 8/2003 | Takeshita |
| 7,923,898 | B2 | * | 4/2011 | Doshida et al. .......... 310/323.09 |
| 2004/0165874 | A1 |   | 8/2004 | Nagae |
| 2007/0152455 | A1 | * | 7/2007 | Ko et al. ....................... 292/201 |
| 2009/0283214 | A1 | * | 11/2009 | Nelson ........................... 156/344 |
| 2010/0126167 | A1 | * | 5/2010 | Nagel et al. ..................... 60/545 |

FOREIGN PATENT DOCUMENTS

| JP | 06-153548 | A |   | 5/1994 |
| JP | 10-217817 |   | * | 8/1998 |
| JP | 2004-258121 | A |   | 9/2004 |
| JP | 2004-354874 | A |   | 12/2004 |
| JP | 3679683 | B2 |   | 8/2005 |
| JP | 2008-187805 | A |   | 8/2008 |
| JP | 2009-136135 |   | * | 6/2009 |
| JP | 2009-136135 | A |   | 6/2009 |

* cited by examiner

*Primary Examiner* — Thomas Dougherty
(74) *Attorney, Agent, or Firm* — Canon U.S.A., Inc. IP Division

(57) ABSTRACT

A vibration wave driven apparatus includes a vibrator configured to generate vibration, a rotor configured to be in frictional contact with the vibrator and to rotate about an axis of rotation, and a transmitting member configured to rotate about the axis and to transmit rotation of the rotor to an external component. A part of the transmitting member forms a worm portion of a worm gear.

27 Claims, 10 Drawing Sheets

VIBRATION WAVE DRIVEN APPARATUS AND IMAGE PICKUP APPARATUS INCLUDING VIBRATION WAVE DRIVEN APPARATUS

BACKGROUND OF THE INVENTION

1. Field of the Invention

The present invention relates to a vibration wave driven apparatus and an image pickup apparatus.

2. Description of the Related Art

Vibration wave driven apparatuses that are applied to products for driving camera lenses or the like include a bar-type vibration wave driven apparatus. Japanese Patent Laid-Open No. 2008-187805 discloses a bar-type vibration wave driven apparatus in which the output of a rotor is transmitted to an external device with a gear interposed therebetween. The mechanism of the known vibration wave driven apparatus will now be described with reference to FIGS. 10A and 10B. FIG. 10A is a cross-sectional view of the known bar-type vibration wave driven apparatus. FIG. 10B is a perspective view of a part where the rotor and the gear engage with each other.

In FIG. 10A, a first elastic body 1, a second elastic body 2, and a multilayer piezoelectric device 3 are fastened by a shaft 4 and a nut 5 with a specific clamping force. A rotor 7 has one surface (the lower end in the drawing) thereof being in contact with a wear-resistant member 6. The wear-resistant member 6 is provided at the upper end of the first elastic body 1. A gear 8 is provided so as to face the other surface of the rotor 7. The gear 8 rotates with the rotor 7 and transmits the output of the vibration wave driven apparatus to an external device. The position of the gear 8 is fixed in a thrust direction along the shaft 4 by a flange (attaching portion) 10 provided for attachment of the vibration wave driven apparatus. A pressure spring 15 for applying a pressure to the rotor 7 is provided between the gear 8 and the rotor 7.

As shown in FIG. 10B, the rotor 7 has a circular recess 7c and in the top surface thereof a pair of grooves 7a and 7b extending radially and axisymmetrically with each other. The gear 8 has on the bottom surface thereof a cylindrical projection 8c configured to engage with the circular recess 7c of the rotor 7, and a pair of projections 8a and 8b (the projection 8b is not shown) configured to engage with the grooves 7a and 7b, respectively, of the rotor 7. With such engagements, the rotation of the rotor 7 is transmitted to the gear 8 and is output.

In the known vibration wave driven apparatus, the gear 8 and a gear of the external device that receives the output from the gear 8 are spur gears. Therefore, the optical axis of a lens barrel of a camera and the axis of rotation of the vibration wave driven apparatus are to be arranged substantially parallel to each other.

On the other hand, the substantially parallel arrangement of the optical axis of the lens barrel and the axis of rotation of the vibration wave driven apparatus restricts the flexibility in the arrangement of the vibration wave driven apparatus. Therefore, further improvement has been demanded for efficient utilization of space.

SUMMARY OF THE INVENTION

According to an aspect of the present invention, a vibration wave driven apparatus includes a vibrator configured to generate vibration, a rotor configured to be in frictional contact with the vibrator and to rotate about an axis of rotation, and a transmitting member configured to rotate about the axis and to transmit rotation of the rotor to an external component. A part of the transmitting member forms a worm portion of a worm gear.

Further features of the present invention will become apparent from the following description of exemplary embodiments with reference to the attached drawings.

DESCRIPTION OF THE EMBODIMENTS

First Embodiment

Figure 1:
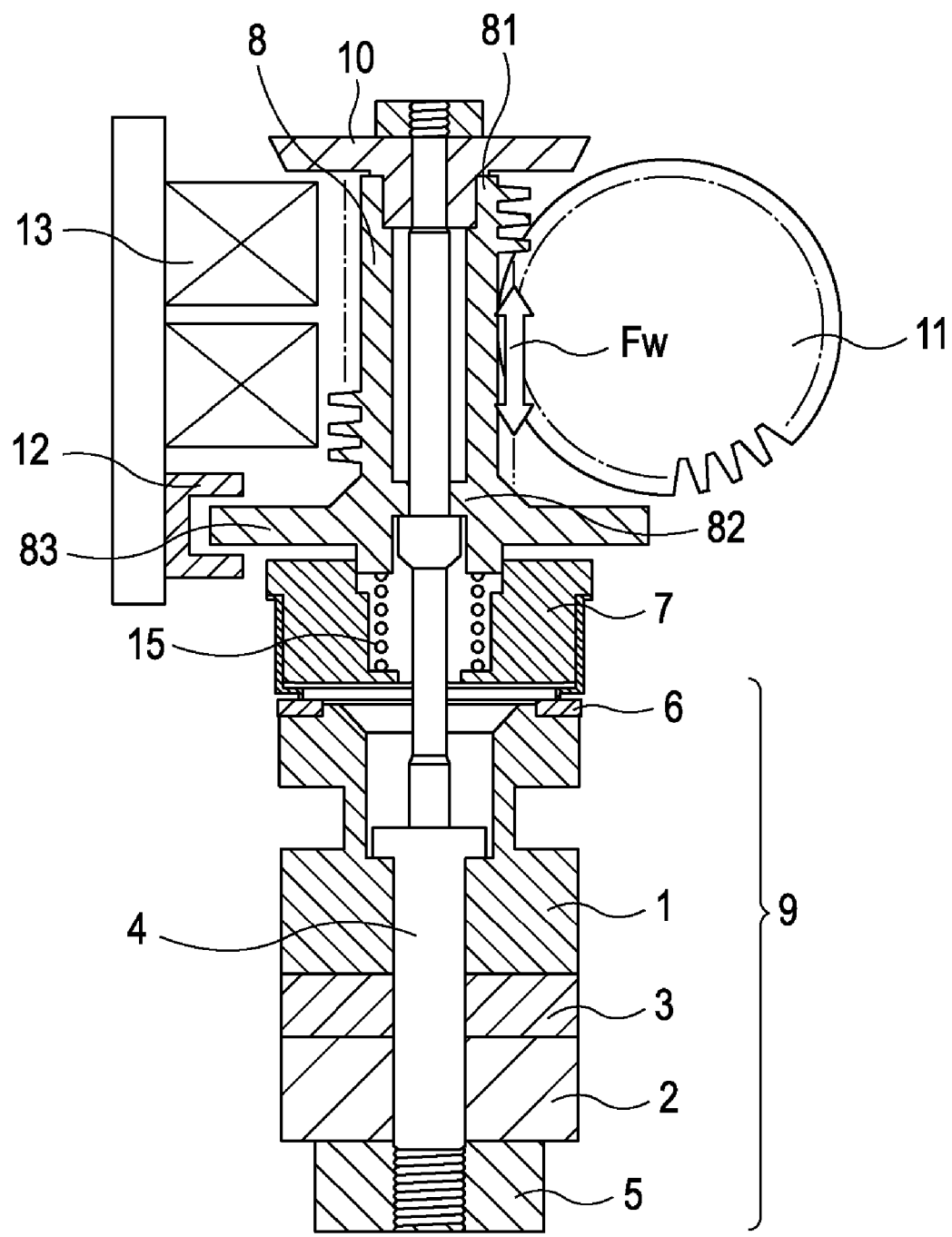
FIG. 1 is a cross-sectional view of a vibration wave driven apparatus according to a first embodiment of the present invention.

FIG. 1 is a cross-sectional view of a vibration wave driven apparatus according to a first embodiment of the present invention. Referring to FIG. 1, a first elastic body 1, a second elastic body 2, and a multilayer piezoelectric device 3, functioning as an electro-mechanical energy conversion element, are fastened by a shaft 4, corresponding to a shaft member, and a nut 5 with a specific clamping force. The first and second elastic bodies 1 and 2 are made of metal such as brass, stainless, or the like. The elastic bodies 1 and 2 and the multilayer piezoelectric device 3 together form a Langevin vibrator.

A rotor 7 has one surface (the bottom surface in the drawing) thereof being in contact with a wear-resistant member 6. The wear-resistant member 6 is provided at the upper end of the first elastic body 1. The one surface of the rotor 7 has a smaller contact area than the other surface (the upper surface in the drawing) of the rotor 7 and has an appropriate spring characteristic. A gear 8, functioning as an output-transmitting member, is provided so as to face the other surface of the rotor 7. The gear 8 coaxially rotates with the rotor 7 and transmits the output of the vibration wave driven apparatus (i.e., the rotation of the rotor 7) to an external device. Details of the gear 8 will be described separately below.

The gear 8 is pressed against a flange 10, functioning as an attaching portion at which the vibration wave driven apparatus is attached to the external device, by a pressure spring 15, intended for application of a pressure to the rotor 7, with a pressure the same as the pressure applied to the rotor 7. The position of the gear 8 is fixed in the thrust direction along the shaft 4 by being in contact with an end surface of the flange 10 with the foregoing pressure.

As in the known bar-type vibration wave driven apparatus, when a high-frequency voltage is applied to the multilayer piezoelectric device 3, a bending vibration having, for example, an ultrasonic frequency is generated on a vibrator device 9. Consequently, an elliptic motion is produced on the top surface of the first elastic body 1 that is in contact with the rotor 7, causing the rotor 7 that is pressed against the wear-resistant member 6 to be in frictional contact with the wear-resistant member 6 and to be driven to rotate. As in the known bar-type vibration wave driven apparatus, the rotor 7 and the gear 8 have on end surfaces thereof a pair of grooves and a pair of projections, respectively, such as the ones shown in FIG. 10B. With the engagement between the grooves and the projections, the rotation of the rotor 7 is transmitted to the gear 8. Thus, the rotor 7, the gear 8, and the pressure spring 15 together rotate about the shaft 4. Frictional contact refers to a state of contact accompanied by friction acting in a direction opposite to the direction of a relative motion occurring between two objects that are in contact with each other. A rotor refers to a component that is rotated by microvibration (an elliptic motion) of a stator and is configured so as to be pressed against a friction plate with a pressure applied by a pressure spring. The rotor is rotated with friction produced at the point of contact because of the elliptic motion occurring on the surface of the stator in contact therewith. A transmitting member is a component intended for transmission of the driving force of a motor to an external device, and is provided between a rotor and a flange. The transmitting member fits to one of the surfaces of the rotor opposite the one having the point of frictional contact. Thus, the transmitting member and the rotor rotate together.

Figure 10A:
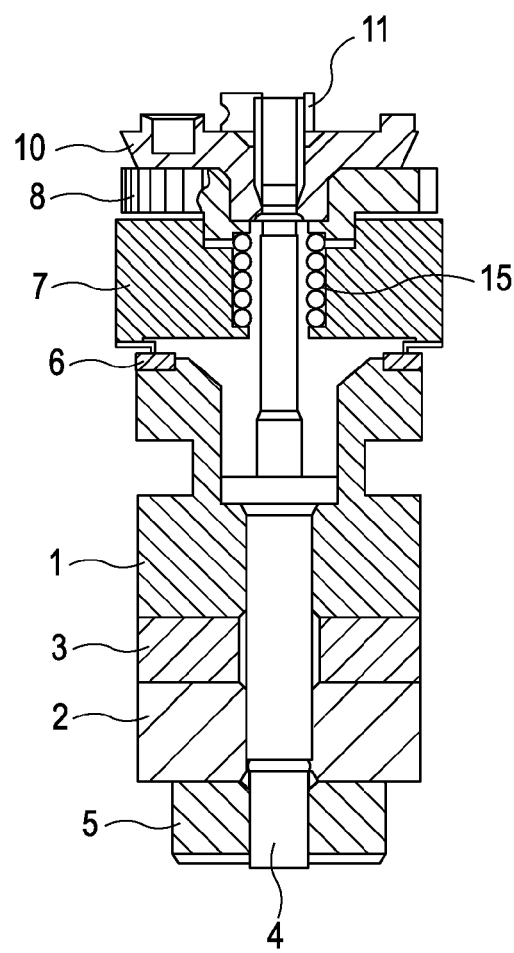
FIG. 10A is a cross-sectional view of a known bar-type vibration wave driven apparatus.
Figure 10B:
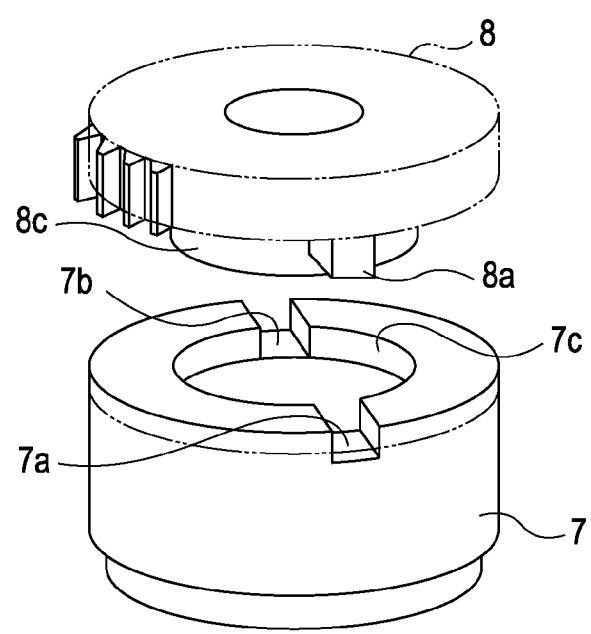
FIG. 10B shows a state of engagement between a gear and a rotor included in the known bar-type vibration wave driven apparatus.

Compared with the gear 8 in the known bar-type vibration wave driven apparatus shown in FIG. 10A, the gear 8 according to the first embodiment is longer in an axial direction, that is, a portion of the gear 8 extending along the shaft 4 is longer. Therefore, in the first embodiment, the diameter of the shaft 4 is larger than in the known device, whereby higher stiffness is obtained. Thus, the vibrator device 9 is supported stably during a driving operation.

Figure 2:
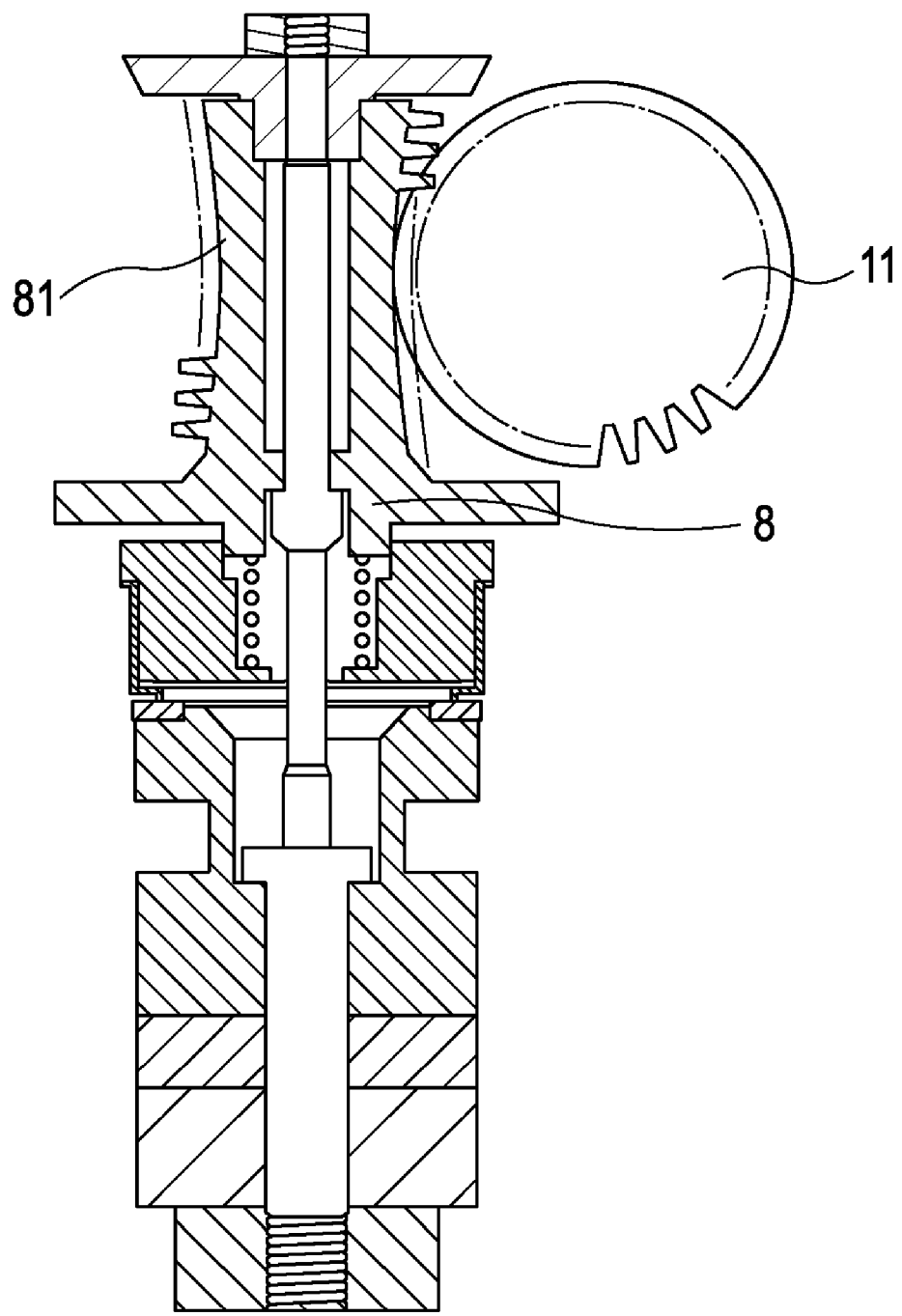
FIG. 2 is a cross-sectional view of the vibration wave driven apparatus according to the first embodiment of the present invention, including a gear of another type.

Details of the gear 8 will now be described. The gear 8 shown in FIG. 1 includes a worm 81 (a worm portion) functioning as an output-extracting portion. The worm 81 and a worm wheel 11, which is an external gear (a first-stage gear), in combination form a worm gear. The worm gear produces a rotating motion about an axis substantially perpendicular to the axis of rotation of the rotor 7. In general, a worm gear refers to a mechanism including a driving gear (worm) and a helical gear (worm wheel) that meshes therewith. The worm has a small diameter and produces thrust in the axial direction thereof at the meshing point. The worm gear is characterized by realizing a high speed-reduction ratio. The worm 81 according to the first embodiment is a cylindrical worm and is provided between the rotor 7 and the flange 10. Needless to say, a double-enveloping worm whose diameter increases toward the ends thereof as shown in FIG. 2 may alternatively be employed. If a double-enveloping worm is employed, a larger area of contact with the worm wheel 11 is provided, improving the wear resistance of the worm.

The output transmission diameter of the worm 81 (the diameter of the worm 81 at the position where the worm 81 meshes with the worm wheel 11) is smaller than the outside diameter of the rotor 7. This is because of the following reason. A thrust Fw produced by torque transmission by the worm gear acts as a moment that causes the gear 8 to tilt with respect to the shaft 4. Therefore, with a smaller output transmission diameter, the moment causing the gear 8 to tilt becomes smaller.

The gear 8 fits to the bottom of the flange 10 at one end (the upper end in FIG. 1) thereof. The gear 8 also fits to the shaft 4 at a stopper 82 projecting inward from the inner periphery thereof. That is, the gear 8 fits to the shaft 4 at two points near the axial-direction ends thereof, the two points providing supports for suppressing changes in the orientation of the gear 8 caused by the thrust Fw. Thus, the gear 8 is prevented from tilting with respect to the shaft 4. The stopper 82 is provided at such a position as to be in contact with a stepped portion of the shaft 4. The thrust Fw is received by the stepped portion of the shaft 4. Thus, the displacement of the gear 8 along the shaft 4 is suppressed. In the first embodiment, the position of the gear 8 in the direction in which the shaft 4 extends is fixed.

Figure 3:
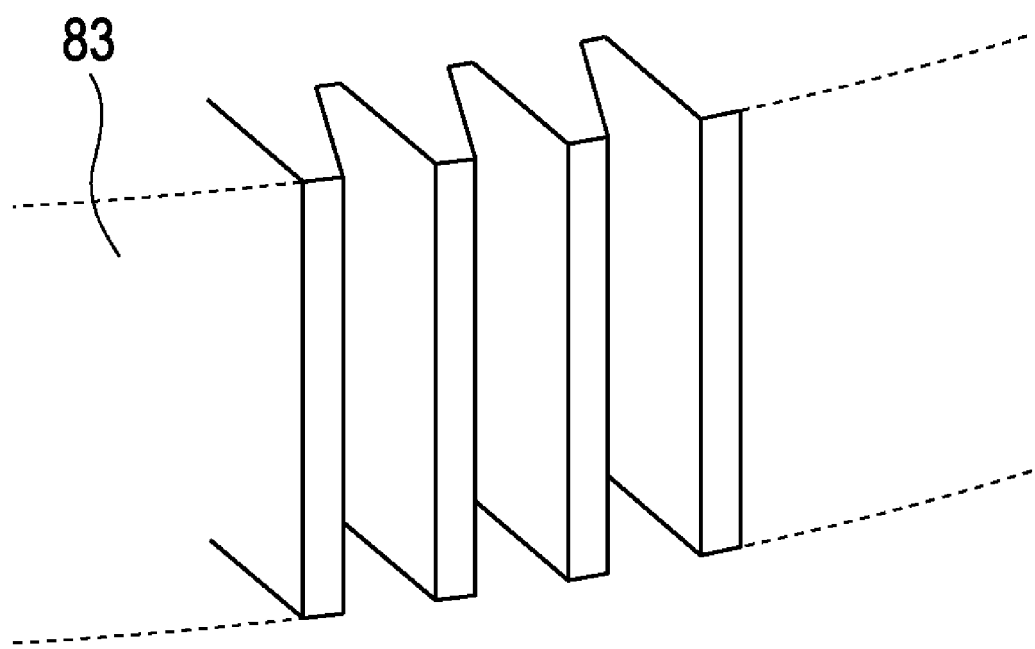
FIG. 3 is a perspective view of slits provided in the gear of the vibration wave driven apparatus according to the first embodiment of the present invention.

The gear 8 also has a flange portion 83 integrally formed thereon with a diameter larger than the diameter of the worm 81. Radially extending slits as shown in FIG. 3 may be provided in the flange portion 83 so that the flange portion 83 and a photointerrupter 12 provided separately therefrom together form a rotational sensor. In such a case, the high speed-reduction ratio of the worm gear is utilized in directly reading the rotation of the vibration wave driven apparatus operating at a high speed, whereby a highly precise driving operation is realized. Needless to say, a rotational sensor may alternatively be obtained by attaching separately prepared slits to the flange portion 83.

In terms of spatial availability, it is beneficial that peripheral spaces about the shaft 4 other than the space occupied by the worm wheel can be used freely. Therefore, in the first embodiment, electrical components 13 are provided on the outer side of the periphery of the worm 81 but on the inner side of the outer periphery of the rotor 7. Unlike typical electromagnetic motors, the vibration wave driven apparatus according to the first embodiment of the present invention is not affected by magnetic fields. Hence, there is no issue even if, for example, a coil that generates a magnetic field is provided and some fluxes of the magnetic field leak to the vibration wave driven apparatus.

To summarize, in the first embodiment, a part of the gear 8, functioning as an output-transmitting member, rotating coaxially with the rotor 7 is configured as a worm of a worm gear. Therefore, the axis of rotation of the vibration wave driven apparatus can be provided substantially perpendicularly to the optical axis of a lens barrel without increasing the number of components.

Second Embodiment

Figure 4:
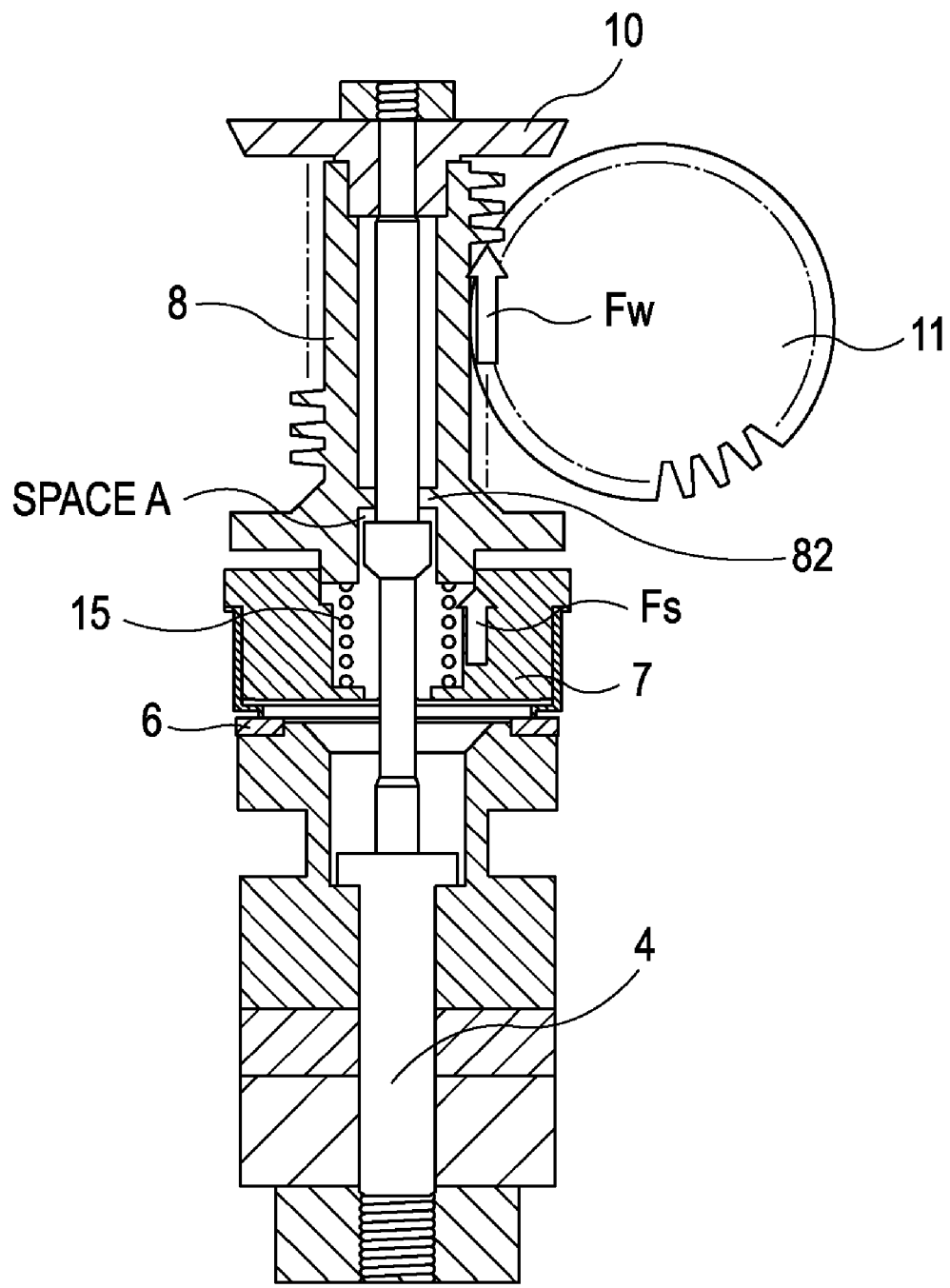
FIG. 4 is a cross-sectional view of a vibration wave driven apparatus according to a second embodiment of the present invention, showing a state where a thrust produced by a worm gear acts toward a flange.
Figure 5:
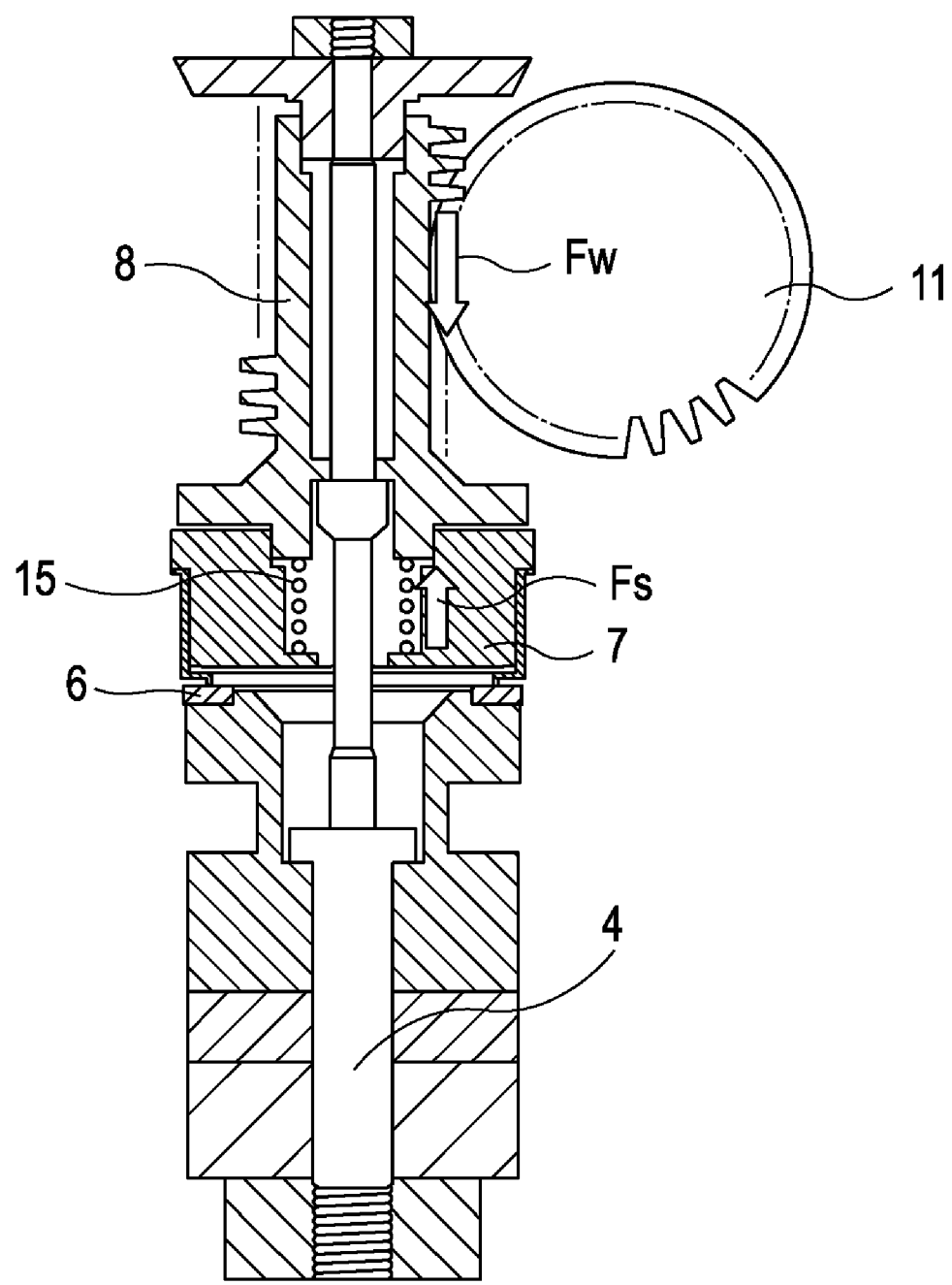
FIG. 5 is a cross-sectional view of the vibration wave driven apparatus according to the second embodiment of the present invention, showing a state where the thrust produced by the worm gear acts toward a rotor.

FIGS. 4 and 5 are cross-sectional views of a vibration wave driven apparatus according to a second embodiment of the present invention. Descriptions of elements having the same shapes as those in the first embodiment are omitted.

In the second embodiment, a space A (a clearance) is provided between the stopper 82 and the stepped portion of the shaft 4 (at a position where the stopper 82 and the shaft 4 fit to each other). Thus, the gear 8 subjected to the thrust Fw produced in torque transmission by the worm gear is movable along the shaft 4.

FIG. 4 shows a state of the vibration wave driven apparatus according to the second embodiment in which the thrust Fw acts toward the flange 10. Hereinafter, the state shown in FIG. 4 is referred to as a first state. The gear 8 is subjected to a pressure acting toward the flange 10 because of a force Fs of the pressure spring 15 that is compressed and the thrust Fw produced by the worm gear. With the pressure produced as the sum of the foregoing forces, the position of the gear 8 in the thrust direction along the shaft 4 is fixed such that the gear 8 is in contact with the flange 10. A friction-driven portion of the rotor 7 (a portion of the rotor 7 that is in frictional contact) with respect to the wear-resistant member 6 is subjected to a pressure defined by the amount of compression of the pressure spring 15 in the above state.

FIG. 5 shows a state of the vibration wave driven apparatus according to the second embodiment where the thrust Fw acts toward the rotor 7. Hereinafter, the state shown in FIG. 5 is referred to as a second state. When the thrust Fw produced by the worm gear is larger than the force Fs produced by the pressure spring 15 pushing up the gear 8 toward the flange 10, the gear 8 moves along the shaft 4 toward the rotor 7 and stops at a position where the force Fs of the pressure spring 15 and the thrust Fw balance each other. When the difference between the force Fs of the pressure spring 15 and the thrust Fw is large, the gear 8 stops at a position where the stopper 82 comes into contact with the stepped portion of the shaft 4. In this state, the gear 8 is in contact with the stepped portion of the shaft 4 with a pressure obtained by subtracting the force Fs of the pressure spring 15 from the thrust Fw. Thus, the position of the gear 8 in the direction in which the shaft 4 extends is fixed. The stepped portion of the shaft 4 is provided at such a position that the end of the gear 8 and the end of the rotor 7 do not come into contact with each other even if the gear 8 moves toward the rotor 7 and that the state where the gear 8 fits to the flange 10 is maintained. As in the first state shown in FIG. 4, the friction-driven portion of the rotor 7 with respect to the wear-resistant member 6 is subjected to a pressure defined by the amount of compression of the pressure spring 15 in the above state.

Accordingly, the amounts of compression of the pressure spring 15 in the first and second states are different from each other, and the pressures applied to the friction-driven portion in the first and second states are different from each other. Specifically, the pressing load applied to the friction-driven portion is larger in the second state where the thrust Fw acts toward the rotor 7 as shown in FIG. 5 than in the first state where the thrust Fw acts toward the flange 10 as shown in FIG. 4.

Especially, the second embodiment of the present invention is designed such that, in a case where the vibration wave driven apparatus is applied to a camera lens, the direction of rotation of the rotor 7, responsible for extension and retraction of a lens barrel, becomes the same as the direction of the thrust Fw. Extension refers to an operation in which the lens barrel moves in such a direction as to project, and retraction refers to an operation in which the lens barrel moves in the opposite direction (a direction in which the lens barrel is housed into the body of the camera).

To extend the lens barrel, the vibration wave driven apparatus is operated in the second state where the rotor 7 is rotated in such a direction that the pressing load applied to the friction-driven portion increases. To retract the lens barrel, the vibration wave driven apparatus is operated in the first state where the pressing load becomes smaller than in the second state. Thus, different driving modes are provided. Specifically, when the lens barrel is extended, the output is increased with a large torque, and when the lens barrel is retracted, the output is reduced with a relatively small torque. The known bar-type vibration wave driven apparatus is configured such that the thrusts produced in the extending operation and the retracting operation are substantially the same. Therefore, if the thrust in the retracting operation is reduced so as to prevent foreign substances from being caught by the lens barrel, the thrust in the extending operation has to be reduced inevitably. In the configuration according to the second embodiment, however, while foreign substances are prevented from being caught by the lens barrel during the retracting operation, a powerful extending operation is realized even if a force that tends to suppress the extension of the lens barrel is applied from outside.

Furthermore, the amplitude of alternating voltage, i.e., a drive signal of the vibration wave driven apparatus, is changed in accordance with the direction of rotation of the rotor 7. Specifically, different widths of a pulse that generates an input signal are provided for the first and second states, respectively, whereby the amplitude of alternating voltage applied to the multilayer piezoelectric device 3 is variable. That is, in the second state, the pressing load applied to the friction-driven portion increases and the friction produced increases. Therefore, the width of the aforementioned pulse is increased and the amplitude of the voltage applied is increased, whereby a stable driving operation is realized.

Figure 6:
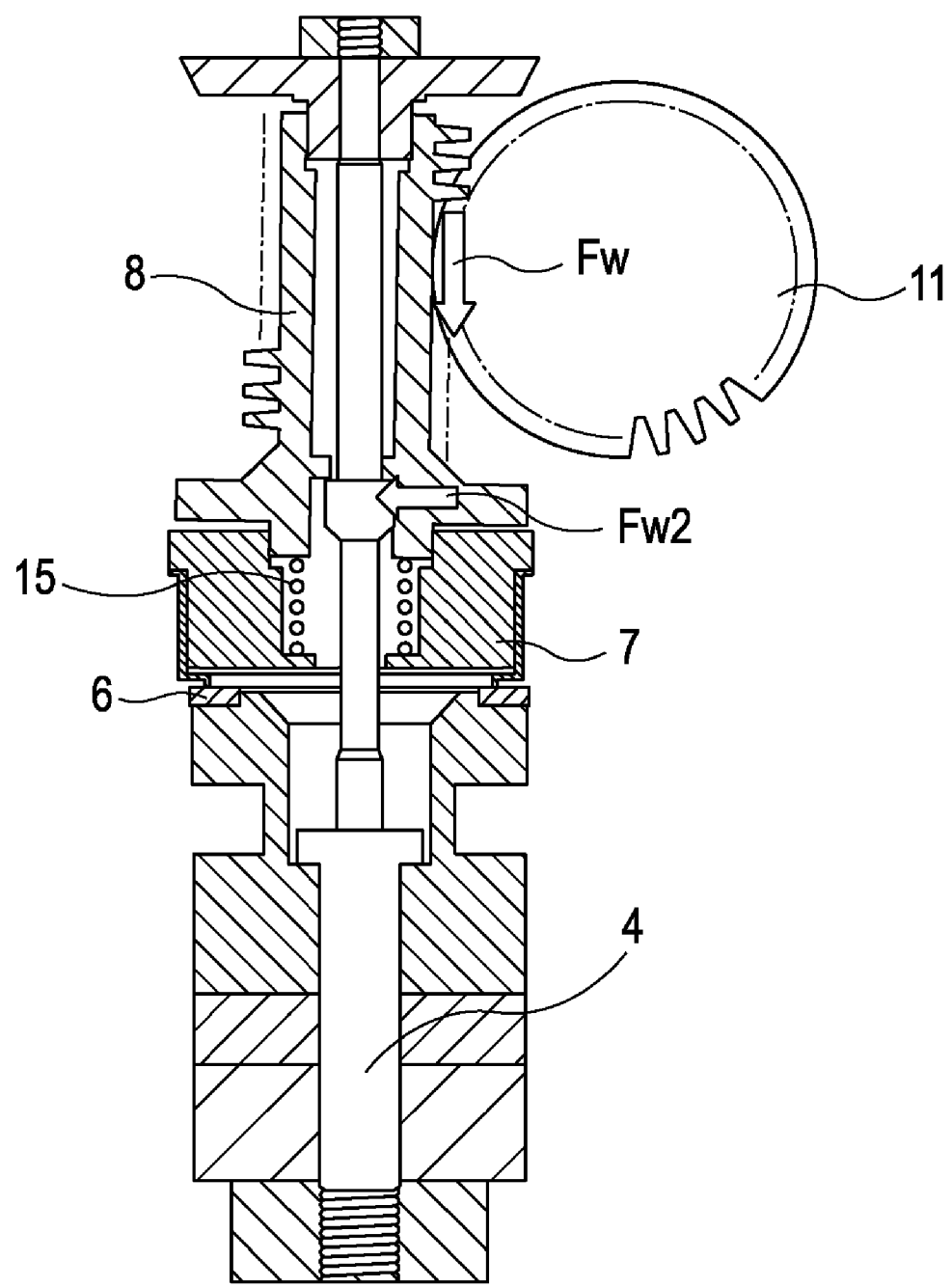
FIG. 6 is a cross-sectional view showing a change in the orientation of the gear during a driving operation in the second embodiment of the present invention.

Next, the behavior of the gear 8 in the second state will be described. FIG. 6 shows the orientation of the gear 8 of the vibration wave driven apparatus according to the second embodiment of the present invention that has been operated for a long period of time. In FIG. 6, for easier recognition, the amount of change in the orientation is scaled larger than actual.

In the second state, the thrust Fw produces a lateral force Fw2 acting radially at the portion of the gear 8 at which the gear 8 fits to the shaft 4. The lateral force Fw2 may lead to wear or deformation at the portion of the gear 8 at which the gear 8 fits to the shaft 4. Furthermore, the thrust Fw acts as a moment that tends to rotate the gear 8 clockwise about the portion of the gear 8 at which the gear 8 fits to the flange 10. Consequently, the gear 8 rotates in a steady orientation shown in FIG. 6.

When such a state is examined in a cross section focusing on peripheral regions about the shaft 4, the pressure spring 15 is more compressed at a portion thereof near the worm wheel 11. Accordingly, there is some nonuniformity in the load applied to press the rotor 7 against the wear-resistant member 6, producing a pressure pattern at the friction-driven portion. Furthermore, the axis of the rotor 7 is pushed toward a side opposite to the side of the worm wheel 11. Consequently, speed variations synchronous with the rotation tend to occur, resulting in an unstable driving operation.

Figure 7:
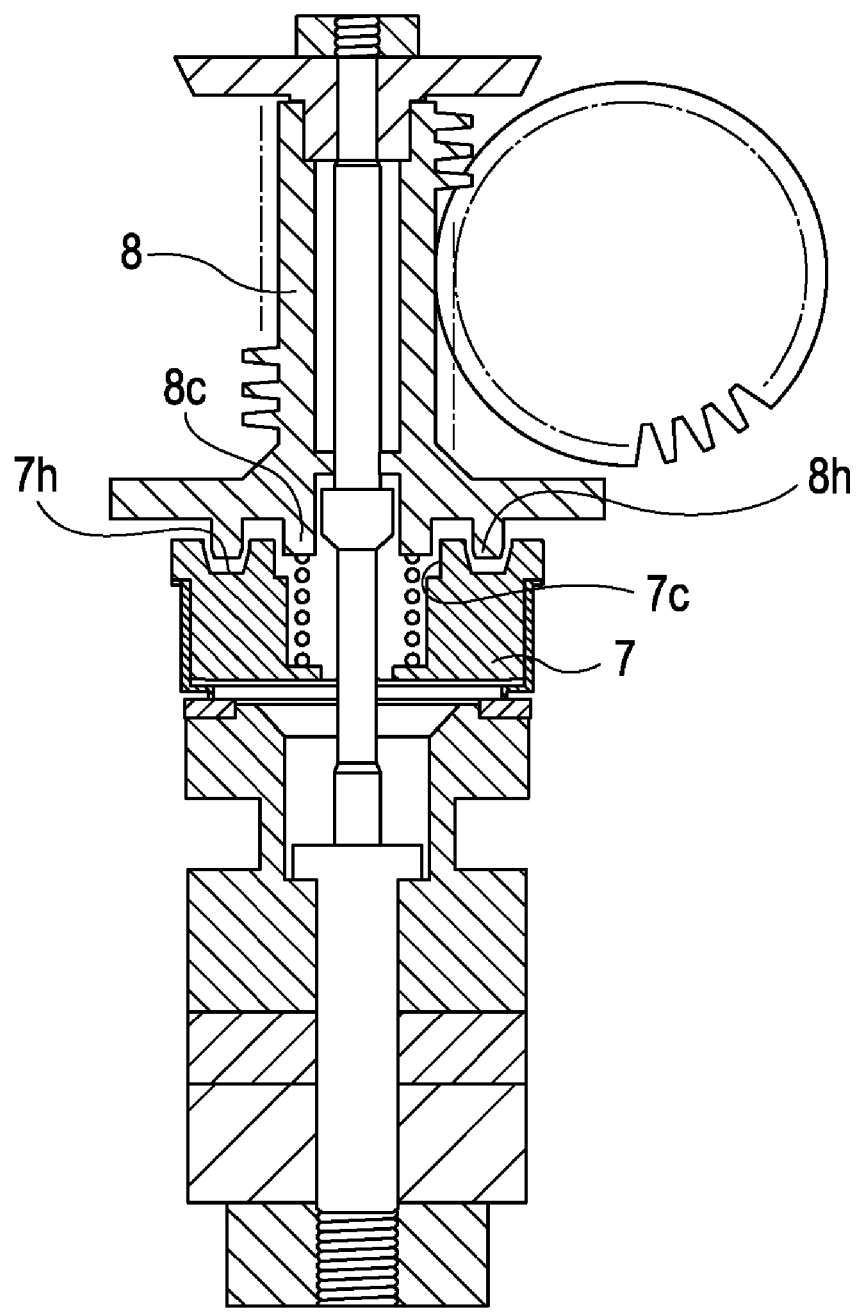
FIG. 7 is a cross-sectional view showing a state of fitting between the rotor and the gear according to the second embodiment of the present invention.

In a situation where a pressure pattern occurs at the friction-driven portion and the axis of the rotor 7 is displaced as described above, an orientation of the rotor 7 allowing the rotor 7 to rotate stably with the axis thereof not being constrained by the gear 8 during the driving operation is determined on the basis of the entirety of the vibration wave driven apparatus. Specifically, as shown in FIG. 7, a clearance (gap) larger than the amount of change in the orientation of the gear 8 can be provided between a circular recess 7c of the rotor 7 and a cylindrical projection 8c of the gear 8 or between each of circular holes 7h of the rotor 7 and a corresponding one of columnar projections 8h of the gear 8. The circular recess 7c and the circular holes 7h are fitting portions of the rotor 7 with respect to the gear 8, and the cylindrical projection 8c and the columnar projections 8h are fitting portions of the gear 8 with respect to the rotor 7.

Figure 8A:
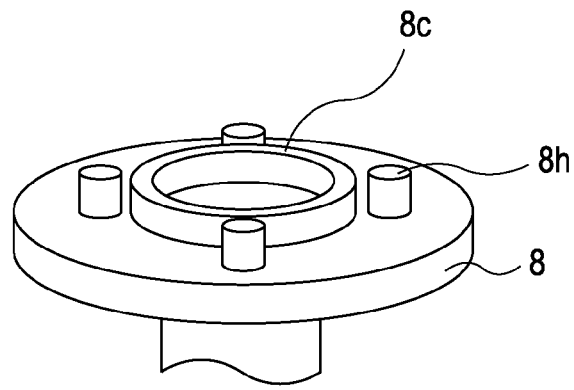
FIG. 8A shows the configuration of a fitting portion of the gear according to the second embodiment of the present invention.
Figure 8B:
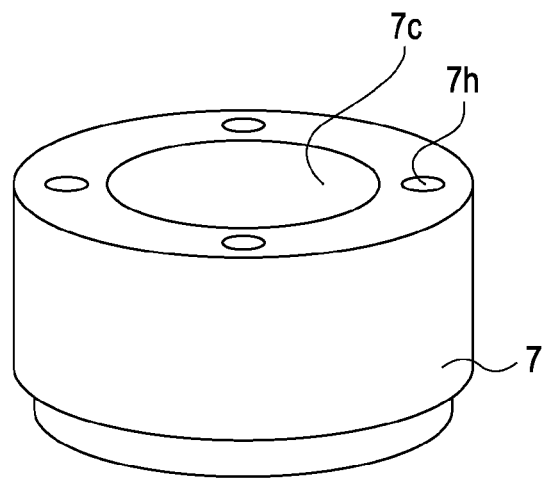
FIG. 8B shows the configuration of a fitting portion of the rotor according to the second embodiment of the present invention.

FIGS. 8A and 8B are perspective views showing the shapes of end surfaces of the rotor 7 and the gear 8, respectively. FIG. 8A shows the end surface of the gear 8 on which four columnar projections 8h are provided on a virtual circle, concentric with the outline of the gear 8, at intervals of 90 degrees. FIG. 8B shows the rotor 7 in which the circular holes 7h are provided in correspondence with the columnar projections 8h, the circular holes 7h each having such a diameter that a sufficient clearance is provided with respect to the corresponding columnar projection 8h. With the circular holes 7h and the columnar projections 8h provided at intervals of 90 degrees, torque is assuredly transmitted from the rotor 7 to the gear 8 through at least one of the columnar projections 8h.

Figure 8C:
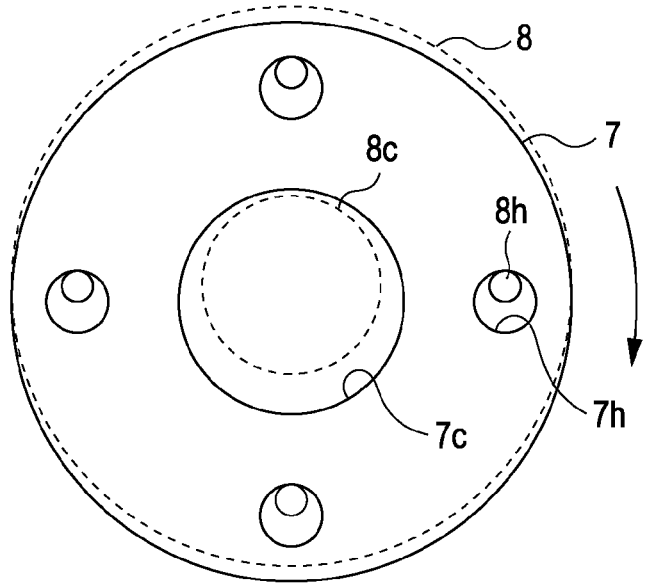
FIG. 8C shows the configurations of the fitting portions of the gear and the rotor according to the second embodiment of the present invention.

FIG. 8C shows a state of the rotor 7 and the gear 8 fitting to each other seen in the axial direction. The rotor 7 is shown by solid lines, and the outline of the gear 8 is shown by broken lines. In FIG. 8C, the gear 8 is eccentric with respect to the rotor 7 with an upward displacement. The maximum allowable amount of eccentricity corresponds to the difference in radius between each circular hole 7h and the corresponding columnar projection 8h. Specifically, a clearance of about 0.1 to 0.3 mm is provided between the circular hole 7h and the cylindrical projection 8h. Torque is transmitted from the rotor 7 to the gear 8 through some of the columnar projections 8h. When the rotor 7 rotates in the direction of the arrow shown in FIG. 8C, torque is transmitted through one of the columnar projections 8h shown on the right in FIG. 8C. Needless to say, the number of columnar projections 8h and the clearance between the columnar projection 8h and the circular hole 7h are to be adjusted appropriately.

To summarize, with a specific clearance provided between each fitting portion of the rotor 7 and the corresponding fitting portion of the gear 8, the rotor 7 that is being driven is not subjected to a force that constrains the orientation thereof in the radial direction. Therefore, regardless of changes in the orientation of the gear 8, the rotor 7 finds by itself such an orientation of the axis thereof as to be stably driven, whereby a smooth driving operation is maintained.

Third Embodiment

Figure 9A:
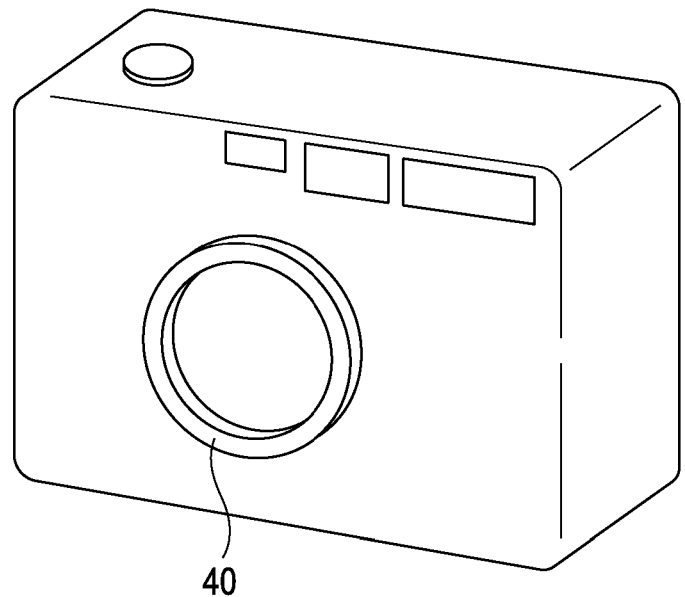
FIG. 9A is a schematic diagram of an image pickup apparatus according to a third embodiment of the present invention.
Figure 9B:
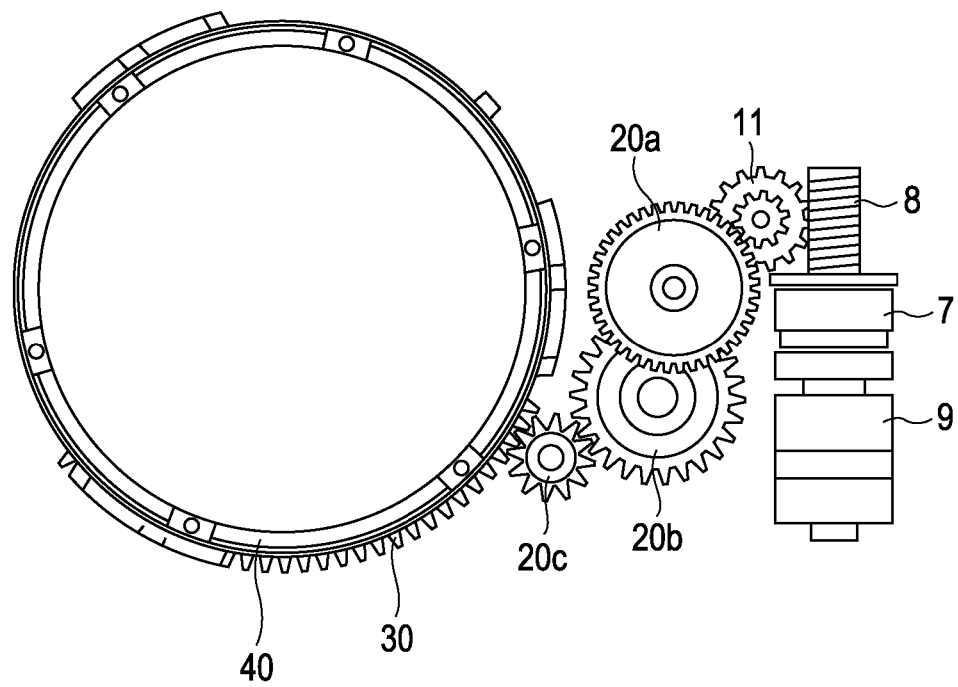
FIG. 9B is another schematic diagram of the image pickup apparatus according to the third embodiment of the present invention.

FIG. 9A is a perspective view showing the appearance of a camera, corresponding to an image pickup apparatus, according to a third embodiment of the present invention. The camera includes a lens barrel 40. FIG. 9B is a schematic diagram of a mechanism that drives the lens barrel 40.

In FIG. 9B, the camera according to the third embodiment includes, on one side of the lens barrel 40, the vibration wave driven apparatus according to any of the above embodiments and speed reduction gears 20a to 20c. The output of the vibration wave driven apparatus is transmitted to a gear 30 provided on the lens barrel 40 through the speed reduction gears 20a to 20c, whereby the lens barrel 40 moves in the direction of the optical axis. The third embodiment employs three speed reduction gears 20a to 20c so as to reduce the rotational output of the worm wheel 11 and to transmit the reduced output to the gear 30 of the lens barrel 40. The number of speed reduction gears may be changed in accordance with the speeds of extension and retraction of the lens barrel 40. Alternatively, such speed reduction gears may be omitted, and the lens barrel 40 may be driven by configuring the worm wheel 11 to directly mesh with the gear 30 of the lens barrel 40.

In the vibration wave driven apparatus according to any of the embodiments of the present invention, a part of the gear 8, functioning as an output-transmitting member, forms the worm 81 of the worm gear and meshes with the worm wheel 11. Therefore, a rotation about an axis extending in the vertical direction of a camera is converted into a rotation about an axis extending along an optical axis. Accordingly, as in the third embodiment, the vibration wave driven apparatus can be provided substantially perpendicularly to the optical axis (that is, the axis of rotation of the vibration wave driven apparatus can be provided substantially perpendicularly to the optical axis of the lens barrel).

Although the vibration wave driven apparatus shown in FIG. 9B is provided on the side of the speed reduction gears 20a to 20c, if the vibration wave driven apparatus and the speed reduction gears 20a to 20c are arranged in line along the optical axis, a compact arrangement is realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-149055 filed Jun. 23, 2009, which is hereby incorporated by reference herein in its entirety.

What is claimed is:

1. A vibration wave driven apparatus comprising:
a vibrator configured to generate vibration;
a rotor configured to be in frictional contact with the vibrator and to rotate about an axis of rotation; and
a transmitting member configured to rotate about the axis and to transmit rotation of the rotor to an external component,
wherein a part of the transmitting member forms a worm portion of a worm gear, and
wherein a transmission diameter of the worm portion is smaller than an outside diameter of the rotor.

2. The vibration wave driven apparatus according to claim 1, wherein the transmitting member is provided between the rotor and an attaching portion at which the vibration wave driven apparatus is attached to the external component.

3. The vibration wave driven apparatus according to claim 1, further comprising:
a shaft member and having a stepped portion,
wherein the transmitting member has a stopper configured to fit to the stepped portion and to limit a tilt of the transmitting member with respect to the shaft member and an amount of displacement along the shaft member.

4. The vibration wave driven apparatus according to claim 3, wherein a clearance is provided between the stopper and the stepped portion so that the transmitting member is movable along the shaft member.

5. The vibration wave driven apparatus according to claim 1, wherein a clearance is provided between a fitting portion of the rotor at which the rotor fits to the transmitting portion and a fitting portion of the transmitting member at which the transmitting member fits to the rotor.

6. The vibration wave driven apparatus according to claim 1, wherein the worm portion is of double-enveloping type having a diameter increasing toward ends thereof.

7. The vibration wave driven apparatus according to claim 1, wherein the transmitting member has a projection integrally formed thereon with a diameter larger than the diameter of the worm portion, the projection having slits extending radially.

8. An image pickup apparatus comprising:
a lens barrel; and
the vibration wave driven apparatus according to claim 1 provided substantially perpendicularly to an optical axis of the lens barrel.

9. The image pickup apparatus according to claim 8, wherein the transmitting member is provided between the rotor and an attaching portion at which the vibration wave driven apparatus is attached to the external component.

10. The image pickup apparatus according to claim 8, further comprising:
a shaft member and having a stepped portion,
wherein the transmitting member has a stopper configured to fit to the stepped portion and to limit a tilt of the transmitting member with respect to the shaft member and an amount of displacement along the shaft member.

11. The image pickup apparatus according to claim 10, wherein a clearance is provided between the stopper and the stepped portion so that the transmitting member is movable along the shaft member.

12. The image pickup apparatus according to claim 8, wherein a clearance is provided between a fitting portion of the rotor at which the rotor fits to the transmitting portion and a fitting portion of the transmitting member at which the transmitting member fits to the rotor.

13. The image pickup apparatus according to claim 8, wherein the worm portion is of double-enveloping type having a diameter increasing toward ends thereof.

14. The image pickup apparatus according to claim 8, wherein the transmitting member has a projection integrally formed thereon with a diameter larger than the diameter of the worm portion, the projection having slits extending radially.

15. A vibration wave driven apparatus comprising:
a vibrator configured to generate vibration;
a rotor configured to be in frictional contact with the vibrator and to rotate about an axis of rotation;
a transmitting member configured to rotate about the axis and to transmit rotation of the rotor to an external component; and
a shaft member having a stepped portion,
wherein a part of the transmitting member forms a worm portion of a worm gear, and
wherein the transmitting member has a stopper configured to fit to the stepped portion and to limit a tilt of the transmitting member with respect to the shaft member and an amount of displacement along the shaft member.

16. The vibration wave driven apparatus according to claim 15, wherein the transmitting member is provided between the rotor and an attaching portion at which the vibration wave driven apparatus is attached to the external component.

17. The vibration wave driven apparatus according to claim 15, wherein a clearance is provided between the stopper and the stepped portion so that the transmitting member is movable along the shaft member.

18. The vibration wave driven apparatus according to claim 15, wherein a clearance is provided between a fitting portion of the rotor at which the rotor fits to the transmitting portion and a fitting portion of the transmitting member at which the transmitting member fits to the rotor.

19. The vibration wave driven apparatus according to claim 15, wherein the worm portion is of double-enveloping type having a diameter increasing toward ends thereof.

20. The vibration wave driven apparatus according to claim 15, wherein the transmitting member has a projection integrally formed thereon with a diameter larger than the diameter of the worm portion, the projection having slits extending radially.

21. The vibration wave driven apparatus according to claim 15, further comprising a pressure spring between the rotor and the transmitting member.

22. An image pickup apparatus comprising:
a lens barrel; and
the vibration wave driven apparatus according to claim 15 provided substantially perpendicularly to an optical axis of the lens barrel.

23. The image pickup apparatus according to claim 22, wherein the transmitting member is provided between the rotor and an attaching portion at which the vibration wave driven apparatus is attached to the external component.

24. The image pickup apparatus according to claim 23, wherein a clearance is provided between the stopper and the stepped portion so that the transmitting member is movable along the shaft member.

25. The image pickup apparatus according to claim 24, wherein a clearance is provided between a fitting portion of the rotor at which the rotor fits to the transmitting portion and a fitting portion of the transmitting member at which the transmitting member fits to the rotor.

26. The image pickup apparatus according to claim 25, wherein the worm portion is of double-enveloping type having a diameter increasing toward ends thereof.

27. The image pickup apparatus according to claim 26, wherein the transmitting member has a projection integrally formed thereon with a diameter larger than the diameter of the worm portion, the projection having slits extending radially.

* * * * *